United States Patent [19]

Burtch et al.

[11] Patent Number: 4,555,296
[45] Date of Patent: Nov. 26, 1985

[54] UNIVERSAL HOT AIR NOZZLE AND SEAL BAR WITH ADJUSTABLE CAM

[75] Inventors: John E. Burtch, Curtice; James A. Hill, Toledo, both of Ohio

[73] Assignee: Owens-Illinois, Inc., Toledo, Ohio

[21] Appl. No.: 669,509

[22] Filed: Nov. 8, 1984

[51] Int. Cl.[4] ............................................. B65C 3/12
[52] U.S. Cl. ..................................... 156/446; 156/86; 156/218; 156/448; 156/456; 156/497; 156/499
[58] Field of Search ..................................... 156/84–86, 156/215, 218, 294, 446–450, 456–458, 497, 499

[56] References Cited

U.S. PATENT DOCUMENTS

| | | | |
|---|---|---|---|
| 4,302,275 | 11/1981 | Burmeister | 156/458 X |
| 4,416,714 | 11/1983 | Hoffman | 156/458 X |
| 4,496,409 | 1/1985 | Konty | 156/85 |

Primary Examiner—David Simmons
Attorney, Agent, or Firm—John R. Nelson

[57] ABSTRACT

A universal hot air nozzle and seal bar with adjustable cam for use on an apparatus for forming and assembling tubular thermoplastic sleeves. The apparatus has a circumferentially movable turret with a plurality of mandrels forming work stations thereon. At the work stations each mandrel has a nozzle and seal bar and the sleeve is wrapped around the coacting mandrel with the vertical edges of the sleeve being disposed in overlapping relation with heat being applied by a stationary heat nozzle to the overlapped edges in coaction with a stationary seal bar being subsequently advanced to the heated overlapped edges with preselected pressure to heat-seal such edges together. The improvement includes cam-actuated telescoping mounting means in the form of a slidable telescoping shaft within a slidable telescoping shaft upon which the seal bar is mounted enabling the seal bar to selectively contact the sleeve with preselected pressure. The cam can be adjusted to cause the seal bar to stay in contact with the sleeve overlapped edges longer at high speeds to effect better sealing.

The heat nozzle is also mounted on adjustable mounting means enabling the heat nozzle to be selectively adjusted to and from the mandrel to heat the overlapped edges of different diameter sleeves.

11 Claims, 3 Drawing Figures

UNIVERSAL HOT AIR NOZZLE AND SEAL BAR WITH ADJUSTABLE CAM

This invention relates to a universal hot air heat nozzle and seal bar with adjustable cam for use on an apparatus for forming thermoplastic sleeves and the like, and more particularly to such a device that has the seal bar mounted on a telescoping means in the form of a slidable telescoping shaft within a slidable telescoping shaft upon which the seal bar is mounted enabling the seal bar to selectively contact the sleeve with preselected pressure. The heat nozzle is also mounted on adjustable means.

The present invention is used on an apparatus of the type shown and described in U.S. patent application Ser. No. 510,482, filed July 5, 1983 now U.S. Pat. No. 4,496,409, and in U.S. Pat. Nos. 3,959,065 and 3,969,173. Such apparatus is used for forming and assembling tubular thermoplastic sleeves, cups, and the like. The apparatus has a rotatable turret with a plurality of mandrels forming work stations thereon, wherein at one of the work stations the sleeve is wrapped around the coacting mandrel with the vertical edges of the sleeve being disposed in overlapping relation with heat being applied by a heat nozzle to the overlapped edges in coaction with a seal bar being subsequently applied to the heated overlapped edges with preselected pressure to heat-seal such edges together. In such prior apparatus, problems are encountered in applying the seal bar against the sleeve and its vertical edges with the correct predetermined pressure. Additionally, a different nozzle must be used for different diameter size sleeves.

Therefore, it is an object of the invention to provide a universal hot air nozzle and seal bar device each with adjustment means wherein the heat nozzle and seal bar are adjustable to and from the sleeve for a large variety of sleeves of different sizes.

A further object of the invention is to provide a device of the above type wherein the seal bar is adjustable to selectively contact the sleeve with preselected pressure.

A further object of the invention is to provide a device of the above type that is simple in construction, inexpensive to manufacture, and highly effective in operation.

Briefly, the foregoing objects are accomplished by the provision of an apparatus for forming and assembling tubular sleeves, the apparatus having a circumferentially movable, rotatable turret with a plurality of mandrels forming work stations thereon. At one of the work stations the sleeve is wrapped around the coacting mandrel with the vertical edges of the sleeve being disposed in overlapping relation, with heat being applied by a heat nozzle to the overlapped edges in coaction with a seal bar being subsequently applied to the heated overlapped edges with preselected pressure to heat-seal such edges together. The invention includes a seal bar telescoping mounting means including a base with a housing disposed on the base, the housing having a longitudinal housing bore disposed perpendicular to the sleeve vertical edges. A primary shaft is telescoped in the housing bore for reciprocation to and from the sleeve. Primary shaft bias means in the form of a coiled spring is secured to the outer end of the primary shaft to bias the primary shaft to an outer position in the housing bore away from the sleeve. The primary shaft has a longitudinal primary shaft bore disposed perpendicular to the sleeve vertical edges. A secondary shaft is threadedly secured in the primary shaft bore and extended partially outward therefrom toward the sleeve. The secondary shaft has a longitudinal secondary shaft bore disposed perpendicular to the sleeve vertical edges. A seal bar mounting shaft is telescoped in the secondary shaft bore for reciprocation to and from the sleeve vertical edges. Seal bar mounting shaft bias means in the form of a coiled spring is disposed in the secondary shaft bore to bias the seal bar shaft to an inner position adjacent the sleeve vertical edges. The seal bar is secured to the inner end of the seal bar mounting shaft adjacent the sleeve. An adjustable cam means is disposed on the outer end of the primary shaft to reciprocate the seal bar against the sleeve vertical edges with preselected pressure. Thus, there is provided a seal bar reciprocating device that is adjustable for a large range of sizes of sleeves, cups, etc., plus the feature that the seal bar presses against the sleeve with a predetermined pressure.

The heat nozzle is also mounted on adjustable mounting means enabling the heat nozzle to be selectively adjusted to and from the mandrel to heat the overlapped edges of different diameter sleeves.

Other objects and advantages of the invention will be apparent from the following description taken in conjunction with the drawings wherein.

In the drawings, like numbers and letters are used to identify like and similar parts throughout the several views.

Figure 1:
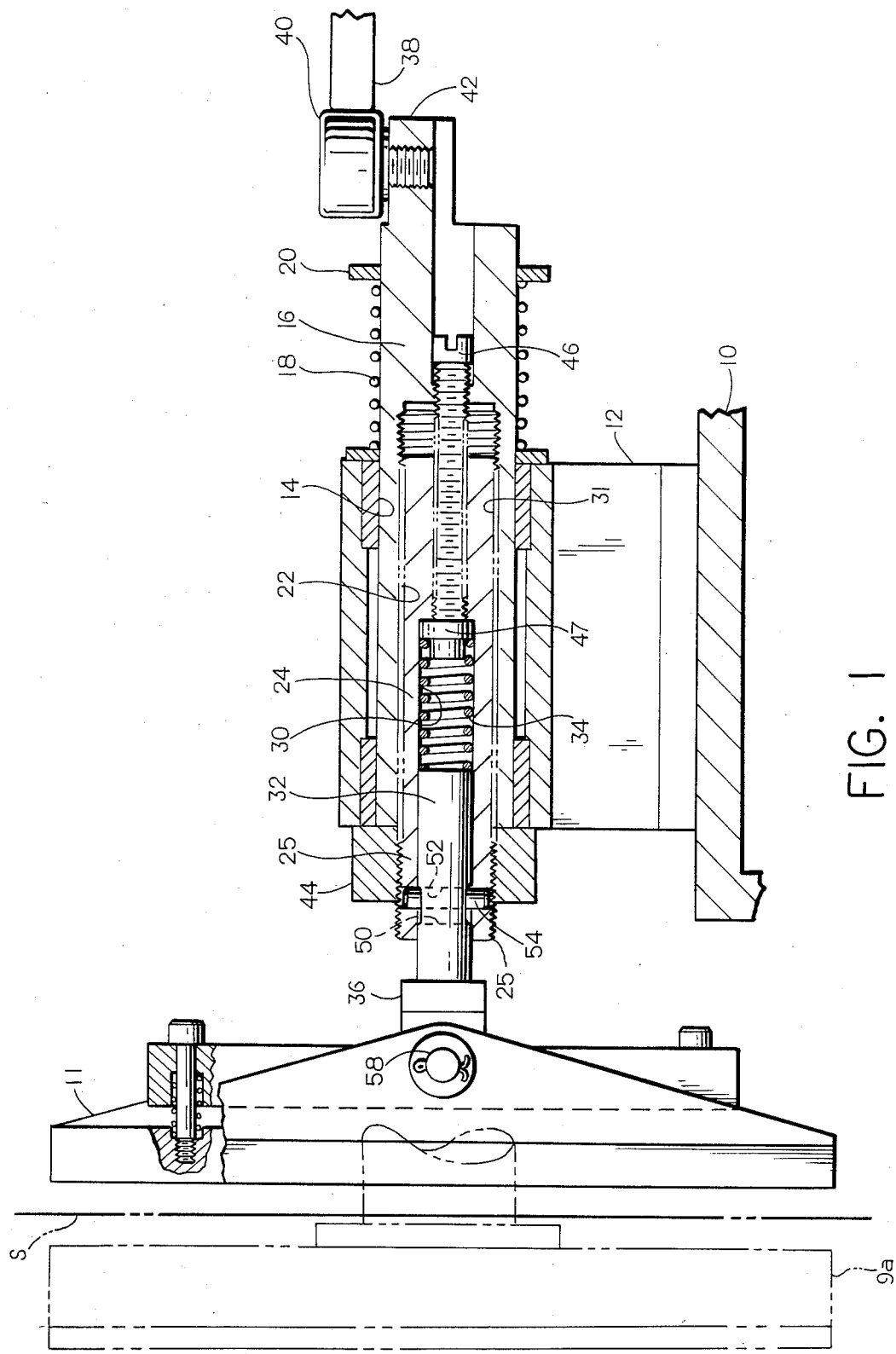
FIG. 1 is a side elevational view, partly in section, of a universal heat nozzle and seal bar device with adjustable cam of the invention.

Referring to the drawings, the invention is used on an apparatus (not shown) for forming and assembling tubular sleeves, the apparatus having a rotatable turret 4 (FIG. 2) with a plurality of mandrels forming work stations thereon, wherein at one of the work stations the sleeve S is wrapped around a coacting mandrel with the vertical edges 6 and 8 of the sleeve being disposed in overlapping relation, with heat being applied by a heat nozzle 9 to the overlapped edges in coaction with a seal bar 11 being subsequently applied to the heated overlapped edges with preselected pressure to heat-seal such edges together, all as described in the aforementioned U.S. patents and patent application. The improvement herein includes a seal bar telescoping mounting means and heat nozzle adjustable mounting means now to be described.

Figure 2:
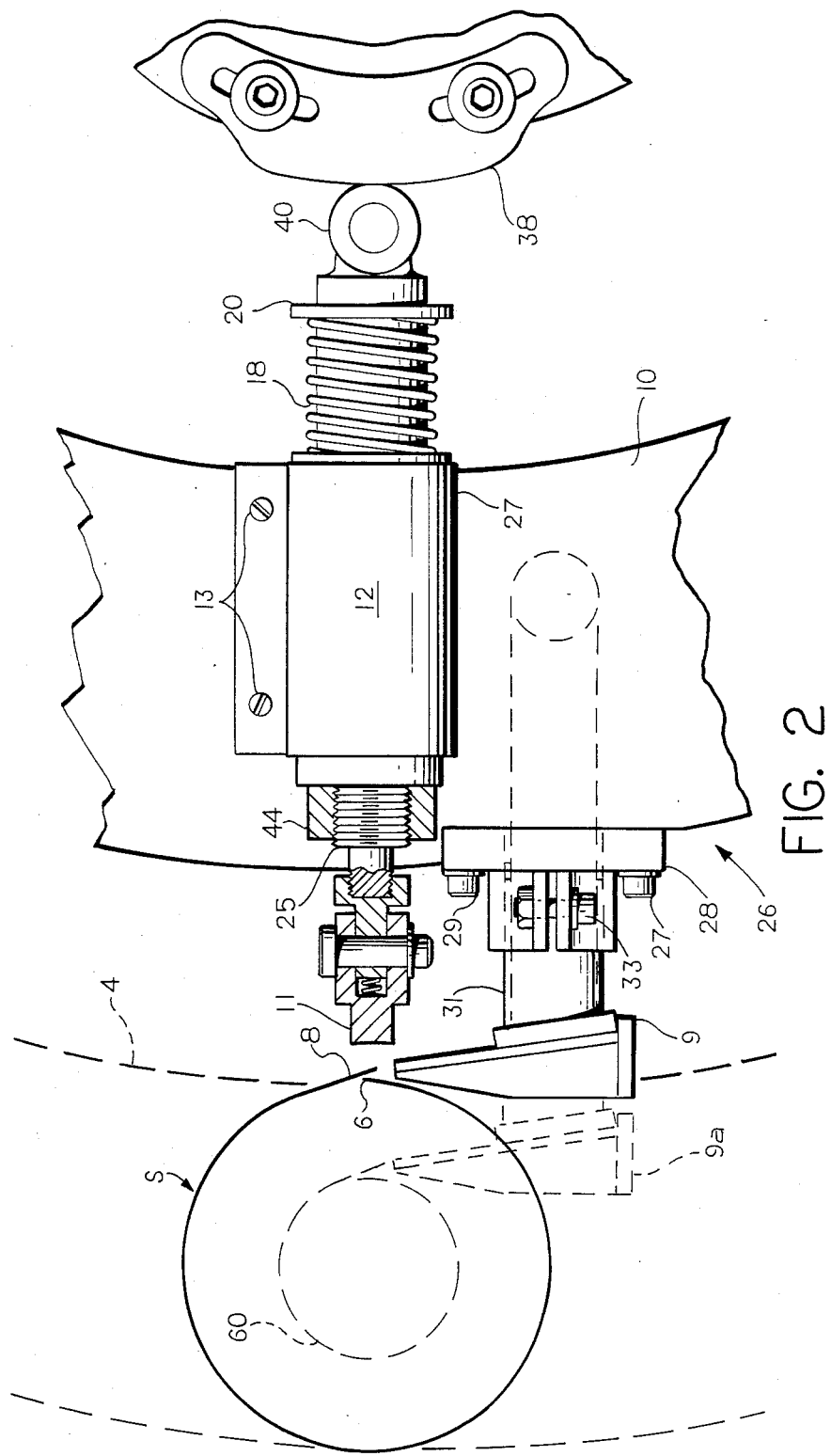
FIG. 2 is a reduced top plan view, partly in section, of the device shown in FIG. 1 and showing in dot-dash lines the heat nozzle in another position for a smaller sleeve.
Figure 3:
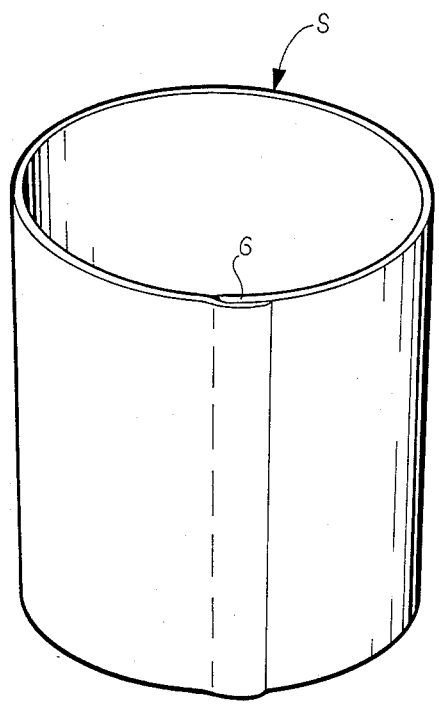
FIG. 3 is a perspective view of the larger of the two sleeves shown in FIG. 2.

In FIGS. 1 and 2, there is shown a rotating base 10 with a heat nozzle and seal bar support or housing 12 secured on the base 10 by the bolts 13. The support or housing 12 has a longitudinal housing bore 14 disposed perpendicular to the sleeve vertical edges 6 and 8. A primary shaft 16 is telescoped in the housing bore 14 for reciprocation therein to and from the sleeve S. Primary shaft bias means in the form of the compressed coiled spring 18 is secured to the outer end of the primary shaft between the primary shaft peripheral flange 20 and the housing 12 to bias the primary shaft 16 to an outer position in the housing bore 14 away from the sleeve S.

The primary shaft 16 has a threaded longitudinal primary shaft bore 22 disposed perpendicular to the sleeve vertical edges 6 and 8. A secondary shaft 24 is threaded into the primary shaft bore 22 and extends partially outward therefrom toward the sleeve.

The secondary shaft 24 has a longitudinal secondary shaft bore 30 disposed perpendicular to the sleeve vertical edges 6 and 8. A seal bar mounting shaft 32 is telescoped into the secondary shaft bore 30 for reciprocation therein to and from the sleeve vertical edges 6 and 8. Seal bar mounting shaft bias means in the form of the compressed coil spring 34 is disposed in the secondary shaft bore 30 to bias the seal bar mounting shaft 32 to an inner position adjacent the sleeve vertical edges 6 and 8. The seal bar 11 is vertically hinged to the inner end of the seal bar shaft 32 by the pin or hinge 58.

Adjustable cam means in the form of the cam 38 and the roller 40 disposed on the outer end 42 of the primary shaft 16 are used to reciprocate, in predetermined sequence, the seal bar 11 against the sleeve vertical edges 6 and 8 with preselected pressure. The cam 38 is adjustable to enable the seal bar to stay in contact with the sleeve overlapped edges 6 and 8 longer at high speeds to effect better sealing.

As aforementioned, the secondary shaft 24 is threaded into the heat nozzle shaft bore 22 providing an adjustment means for adjusting the seal bar 11 to and away from the mandrel (not shown) for different diameter size sleeves.

The heat nozzle bracket 26 is secured to the heat nozzle and seal bar support 12. The heat nozzle adjustable mounting clamp member 28 is secured to the bracket 26 by the bolts 29. The heat nozzle 9 is secured to the bracket 26 by the bolts 29. The heat nozzle 9 is secured to an elongated tube 31 which is secured in the member 28. By loosening the bolt 33 on the heat nozzle adjustable mounting clamp member 28, the heat nozzle 9 can be advanced to or withdrawn from the mandrel with the sleeve S thereon, thus providing a heat nozzle adjustment for different diameter sleeves.

A lock nut 44 is threaded onto the outer portion 25 of the secondary shaft 24 to adjustably secure the secondary shaft in the primary shaft bore 22 for different size sleeves.

An adjustment screw 46 is threadedly secured in the outer end 31 of the secondary shaft bore 30 adjacent the cam means 38, 40, with the inner end 47 of the screw contacting the seal bar mounting shaft spring 34 to adjust the compression of such spring. This structure enables the tension of the spring 34 to be adjusted exteriorly of the device by turning the screw 46 as shown in FIG. 1.

The seal bar mounting shaft 32 has a transverse longitudinal slot 50 (FIG. 1) formed therein, and the secondary shaft 24 has a transverse aperture 52 in alignment with and a part of the slot 50. A lock pin 54 of approximately the same diameter as the aperture 52 extends through such aperture and the slot 50, the pin 54 being of lesser size than the slot 50 to allow limited reciprocation travel of the seal bar mounting shaft 32 within the secondary shaft bore 30.

As aforementioned, the seal bar 11 is horizontally hinged by the pin 58 to the seal bar mounting shaft 32 to allow the seal bar to float and achieve snug vertical contact with the sleeve vertical edges 6 and 8.

Thus, the invention is adaptable to different size sleeves such as a larger type sleeve S as shown in FIG. 2, and a smaller type sleeve 60 as shown in FIG. 2.

The heat nozzle 9 is horizontally adjustable, as previously mentioned, to various horizontal positions such as the secondary position 9a of FIG. 2.

The terms and expressions which have been employed are used as terms of description, and not of limitation, and there is no intention, in the use of such terms and expressions, of excluding any equivalents of the features shown and described or portions thereof, but it is recognized that various modifications are possible within the scope of the invention claimed.

What is claimed is:

1. An apparatus for forming and assembling tubular thermoplastic sleeves, the apparatus having a circumferentially movable turret with a plurality of mandrels forming work stations thereon, wherein at one of the work stations each mandrel has a heat nozzle and a seal bar and the sleeve is wrapped around the coacting mandrel with the vertical edges of the sleeve being disposed in overlapping relation with heat being applied by the heat nozzle to the overlapped edges in coaction with the seal bar being subsequently applied to the heated overlapped edges with preselected pressure to heat-seal such edges together, the improvement thereon comprising; longitudinally telescoping means upon which the seal bar is mounted adjacent the turret enabling the seal bar to selectively contact the sleeve vertical edges with preselected pressure.

2. In an apparatus for forming and assembling tubular sleeves, the apparatus having a circumferentially movable turret with a plurality of mandrels forming work stations thereon, wherein at one of the work stations each mandrel has a seal bar and a heat nozzle and the sleeve is wrapped around the coacting mandrel with the vertical edges of the sleeve being disposed in overlapping relation with heat being applied by the heat nozzle to the overlapped edges in coaction with the seal bar being subsequently applied to the heated overlapped edges with preselected pressure to heat-seal such edges together, the improvement thereon including seal bar longitudinally telescoping mounting means comprising; a stationary base, a housing disposed on said base and having a longitudinal housing bore disposed perpendicular to the sleeve vertical edges, a primary shaft telescoped in said housing bore for reciprocation therein to and from the sleeve, primary shaft bias means secured to the outer end of the primary shaft to bias the primary shaft to an outer position in the housing bore away from the sleeve, said primary shaft having a longitudinal primary shaft bore disposed perpendicular to the sleeve vertical edges, a secondary shaft secured in the primary shaft bore and extending partially outward therefrom toward the sleeve, said secondary shaft having a longitudinal secondary shaft bore disposed perpendicular to the sleeve vertical edges, a seal bar mounting shaft telescoped in the secondary shaft bore for reciprocation to and from the sleeve vertical edges, seal bar mounting shaft bias means disposed in the secondary shaft bore to bias the seal bar mounting shaft to an inner position adjacent the sleeve vertical edges, the seal bar being secured to the inner end of the seal bar mounting shaft adjacent the sleeve, and adjustable cam means disposed on the outer end of the primary shaft away from the sleeve to reciprocate in predetermined sequence the seal bar against the sleeve with preselected pressure.

3. The structure of claim 2 wherein said secondary shaft is threaded partially into the primary shaft bore providing an adjustment means for adjusting the seal bar to and away from the mandrel for different diameter size sleeves.

4. The structure of claim 3 and further including a lock nut threaded onto that portion of the secondary shaft that extends out of the primary shaft base to adjustably lock the secondary shaft in the primary shaft bore.

5. The structure of claim 2 wherein said primary shaft has a peripheral flange positioned adjacent the cam means and said primary shaft bias means is a coiled spring encircling the primary shaft and compressed between said flange and said housing.

6. The structure of claim 2 wherein said seal bar mounting shaft bias means is a compressed coiled seal bar mounting shaft spring disposed in the secondary shaft bore between the seal bar mounting shaft and an intermediate point in the secondary shaft bore.

7. The structure of claim 6 and further including an adjustment screw threadedly secured in the outer end of the secondary shaft bore adjacent the cam with the inner end of the screw contacting said seal bar mounting shaft spring to adjust the compression of such spring.

8. The structure of claim 2 wherein said seal bar mounting shaft has a partially elongated transverse slot formed therein, and said secondary shaft has a transverse aperture in alignment with a portion of said slot, and further including a lock pin of approximately the same diameter as the aperture and extending through the aperture and through the slot, said pin being of lesser size than the slot to allow limited reciprocation travel of the seal bar mounting shaft within the secondary shaft bore.

9. The structure of claim 2 wherein the seal bar is horizontally hinged to the seal bar mounting shaft to allow the seal bar to float to achieve snug vertical contact with the sleeve vertical edges.

10. The structure of claim 2 and further including adjustable mounting means mounted on said base and upon which the heat nozzle is mounted enabling the heat nozzle to be selectively adjusted to and from the mandrel to heat the overlapped edges of different size sleeves.

11. An apparatus for forming and assembling tubular thermoplastic sleeves, the apparatus having a circumferentially movable turret with a plurality of mandrels forming work stations thereon, wherein at one of the work stations each mandrel has a heat nozzle and a seal bar and the sleeve is wrapped around the coacting mandrel with the vertical edges of the sleeve being disposed in overlapping relation with heat being applied by a heat nozzle to the overlapped edges in coaction with a seal bar being subsequently applied to the heated overlapped edges with preselected pressure to heat-seal such edges together, the improvement thereon comprising; longitudinally telescoping means upon which the seal bar is mounted adjacent the turret enabling the seal bar to selectively contact the sleeve vertical edges with preselected pressure, and adjustable mounting means for adjusting the distance of the heat nozzle to the overlapped edges.

* * * * *